May 6, 1947.  C. J. T. YOUNG  2,420,279

LAMINATED POLARIZER AND BI-REFRINGENT LAYERS

Filed June 9, 1944

INVENTOR.
Clinton J. T. Young
BY Donald L. Brown
Attorney

Patented May 6, 1947

2,420,279

UNITED STATES PATENT OFFICE 2,420,279

LAMINATED POLARIZER AND
BIREFRINGENT LAYERS

Clinton J. T. Young, Cambridge, Mass., assignor to Polaroid Corporation, Cambridge, Mass., a corporation of Delaware Application June 9, 1944, Serial No. 539,540

7 Claims. (Cl. 88—65)

This invention relates to laminating, and more particularly to laminations including two or more rigid elements composed of materials having different coefficients of thermal expansion.

It is one object of the present invention to provide in such a lamination means for compensating for strains introduced by temperature changes and for preventing damage resulting from such strains.

Another object is to accomplish the above purpose by providing a layer of soft and resilient adhesive material between two rigid elements having different coefficients of thermal expansion and by making said layer sufficiently thick to absorb relative displacement between said elements resulting from changes in temperature.

A further object of the invention is to accomplish the above purpose by providing a lamination of the type described with a mounting rim or similar protective means composed of material of relatively low heat conductivity and thereby to slow the transfer of heat into and out of said lamination.

Still further objects are to provide a lamination comprising a rigid element of relatively fragile material bonded to a second rigid element of substantially less fragile material and a substantially different coefficient of thermal expansion by means of a relatively thick layer of resilient adhesive material, to provide such a lamination wherein said fragile element comprises birefringent crystalline material such as calcite and said less fragile element comprises glass, to provide such a lamination including layers of light-polarizing material, and to provide such a lamination wherein said adhesive layers comprise a plasticized, polymerized, incomplete polyvinyl acetal resin and particularly wherein the plasticizer for said resin comprises castor oil.

Figure 1:
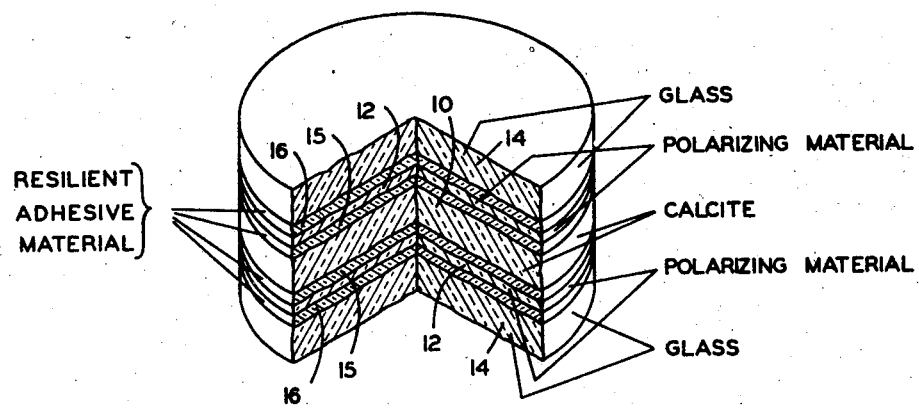
Figure 2:
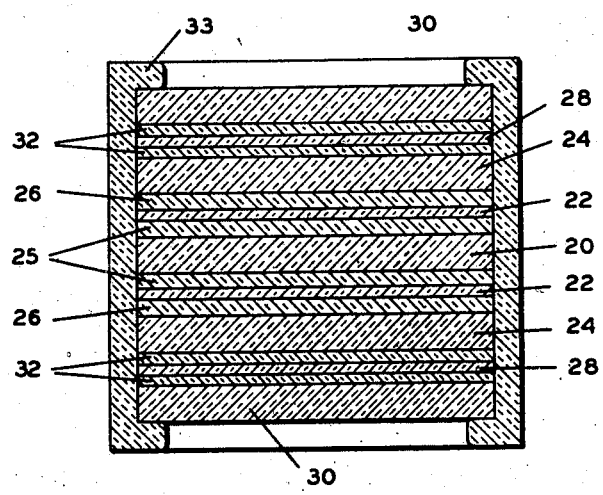

Additional objects and advantages will in part appear and in part be pointed out in the course of the following detailed description of several embodiments of the invention, which are given as non-limiting examples, in connection with the accompanying drawings, in which Figure 1 is an enlarged perspective view, partly cut away, illustrating diagrammatically an embodiment of the invention; and Figure 2 is a sectional view illustrating a somewhat modified embodiment of the invention.

There has recently been developed a new and improved sight for firearms, cameras and the like which comprises a birefringent element mounted between light-polarizing elements in such manner as to provide an interference pattern at optical infinity which constitutes the reticle of the sight. An example of such a device is shown in Fig. 1 and comprises a basal section of calcite 10 mounted between a pair of light-polarizing elements 12 and a pair of outer protective layers of glass 14. It has been found that when such elements are assembled and laminated in accordance with conventional methods, changes of temperature give rise to a very serious problem of shearing strain resulting from the different coefficients of thermal expansion of the various elements. This problem is particularly acute in the case of calcite because of the fact that it has a negative coefficient as opposed to the positive coefficient of glass. The relatively different actions of the glass and calcite layers as the temperature changes, set up shearing forces in the adhesive layer which cause one of two undesirable results. If the adhesion to both glass and calcite is high, the calcite, which is considerably more fragile than the glass, tends to fracture or "twin," and this produces serious distortion in the interference pattern visible through the device. If, on the other hand, the adhesion is not sufficiently high to resist the shear thereon, separation will occur at the surface of the element for which the adhesion is lower.

In accordance with the present invention the above difficulties are successfully overcome by providing between calcite layer 10 and each of glass layers 14 one or more layers 15, 16 comprising relatively soft and resilient adhesive material. Said layers, and particularly layers 15 adjacent calcite layer 10 will be of sufficient thickness and resiliency to be capable of substantial deformation and absorption of the shearing forces set up by relative displacement between calcite layer 10 and glass layers 14 resulting from changes of temperature or other causes. For example, excellent results have been obtained by the use of an adhesive comprising a polymerized, incomplete polyvinyl acetal resin such as polyvinyl butyral plasticized with glycerol triricinoleate in proportions of approximately two parts resin to three parts plasticizer. The thickness of adhesive layers 15 and 16 may vary considerably, depending primarily on the diameter of the other layers, since for the same set of materials and temperature change the magnitude of the shearing force will depend upon the area over which it is exerted. By way of illustrative example, however, layer 10 may comprise calcite 0.060 inch in thickness and 1.125 inches in diameter, layers 12 may comprise a suspension of oriented light-polarizing crystals in cellulose acetate of the type sold under the trade name "Polaroid" and of a thickness of the order of 0.003 inch, and layers 14 may comprise glass approximately 0.060 in thickness. Layers 15 and 16 may then comprise the above mentioned plasticized polyvinyl acetal resin in a thickness of the order of 0.006 inch.

It will of course be understood that the choice of materials for use as adhesives in the practice of the present invention is relatively wide and depends to a considerable extent upon the materials to be laminated and the conditions under which the resulting product is to be used. Thus in the above example other plasticizers may be used or other resins, preferably plasticized, such as acrylic or methacrylic acid derivatives, for example, n-hexyl methacrylate or the acrylic resin sold under the trade name "Plexigum." It also will be apparent that the invention is not limited to the specific cases described herein but is applicable to any lamination including substantially rigid elements having substantially different coefficients of thermal expansion. The invention is particularly applicable to laminations of optical elements, including not only devices wherein strain may result in physical change, but also devices wherein strain will alter or impair optical properties without permanent effect. It should be noted that the results obtained by means of the invention appear to be improved by including between two rigid elements of substantially different coefficients a third relatively hard but flexible element such as sheet plastic material. An example of this feature of the invention is layers 12 of polarizing material between calcite layer 10 and glass layers 14. Furthermore, it is not essential for the purposes of the invention for outer adhesive layers 16 to be of the same properties as inner adhesive layer 15 provided the latter is of sufficient thickness and resiliency.

Fig. 2 shows a somewhat modified form of the invention and more particularly a sight of the type described above wherein circularly polarizing material is employed. In Fig. 2, central layer 20 may comprise calcite, sodium nitrate, or some other suitable birefringent material. Layers 22 represent quarter-wave retardation material such, for example, as suitably molecularly oriented cellulose acetate sheet or film, and layers 24 comprise glass. Layers 25 and 26 correspond to layers 15 and 16 in Fig. 1 and comprise adhesive material such, for example, as one of the materials described above in connection with layers 15 and 16. Each of layers 28 comprises light-polarizing material having its axis at an angle of substantially 45° to one of the vibration directions of its adjacent quarter-wave element 22. Outer layers 30 comprise glass. It has been found advantageous, although not essential, to employ in layers 28 light-polarizing material produced in accordance with U. S. Patent No. 2,237,567 and comprising a sheet of molecularly oriented polyvinyl alcohol having incorporated therein a dichroic stain comprising iodine. In this case, adhesive layers 32 between each of polarizing layers 28 and glass layers 30 may preferably comprise a methacrylic resin such, particularly, as butyl methacrylate, although many other adhesive materials may be used.

The assembling of the device illustrated in Fig. 2 preferably comprises two main stages. The first is the laminating of layers 20, 22, 24, 25, and 26, and the second is the addition of layers 28 and 30 by means of adhesive layers 32. In the latter step, layers 32 are applied in partially polymerized condition and their polymerization is then completed in situ. It has been found that during this second stage the adhesive used in layers 24 and 25, particularly in the case of polyvinyl butyral, has a tendency to absorb the monomer or vapor of the methacrylic resin in layers 32, giving rise to bubbles within the lamination. This result may be prevented by providing layers 25 and 26 with a coating sealing their outer edges and comprising a material substantially impervious to said monomer and vapor. In the case of butyl methacrylate, excellent results have been obtained by means of an edge seal comprising polyvinyl alcohol, which may, for example, be applied in water solution and then dried.

It should be pointed out that the invention is not limited to the above described embodiment employing circularly polarizing material. On the contrary, layers 12 in Fig. 1 may comprise circularly polarizing material formed by bonding a sheet of a suitable quarter-wave retardation material directly to a sheet of plane polarizing material. For example, if both sheets comprise cellulose acetate, they may easily be bonded together by means of acetone or another mutual solvent. All such modifications are to be construed as coming within the scope of the invention.

It has been found that the results obtained by means of the novel laminations of the invention are materially improved under some conditions if the lamination is provided with a suitable mounting or rim comprising material of relatively low heat conductivity. Such a rim is illustrated by element 33 in Fig. 2, and examples of materials suitable for use therein include wood and a variety of readily available resins or plastics such as Bakelite, cellulose acetate, and methyl methacrylate. This modification has been found particularly useful in the case of optical elements whose optical properties are subject to distortion caused by strain resulting from nonuniform temperatures throughout the whole of the element. Rim 33 acts to slow the transfer of heat into and out of the enclosed lamination and thus tends to maintain the inside temperature more nearly uniform. It will be apparent that a rim such as rim 33 may also be used with laminations of the type shown in Fig. 1, and also that in some cases satisfactory results may be obtained by means of such a rim as a protection of a lamination of the type herein described made by means of conventional adhesive layers without departing from within the scope of the invention.

Since certain changes in carrying out the above process, and certain modifications in the article which embody the invention may be made without departing from its scope, it is intended that all matter contained in the above description or shown in the accompanying drawing shall be interpreted as illustrative and not in a limiting sense.

What is claimed is:

1. As a new article of manufacture, a lamination comprising, in combination, two layers of glass, two elements comprising quarter-wave retardation material positioned between said glass layers, a birefringent crystalline element positioned between said quarter-wave elements and comprising material having a coefficient of thermal expansion substantially different from that of glass, a relatively thick layer comprising resilient adhesive material bonding said crystalline element to each of said quarter-wave elements, and a layer of light-polarizing material bonded between each of said quarter-wave elements and said glass layers with the axis thereof at an angle of substantially 45° to a vibration direction of the quarter-wave element adjacent thereto.

2. As a new article of manufacture, a lamination comprising, in combination, two layers of glass, two elements comprising quarter-wave retardation material positioned between said glass layers, a birefringent crystalline element positioned between said quarter-wave elements and comprising material having a coefficient of thermal expansion substantially different from that of glass, a relatively thick layer comprising resilient adhesive material bonding said crystalline element to each of said quarter-wave elements, and a layer of light-polarizing material bonded between each of said quarter-wave elements and said glass layers with the axis thereof at an angle of substantially 45° to a vibration direction of the quarter-wave element adjacent thereto, the bonding material between said light-polarizing layers and said glass layers comprising relatively thick layers of resilient adhesive material similar to said adhesive layers between said crystalline element and said quarter-wave elements.

3. As a new article of manufacture, a lamination comprising, in combination, two layers of glass, two elements comprising quarter-wave retardation material positioned between said glass layers, a birefringent crystalline element positioned between said quarter-wave elements and comprising material having a coefficient of thermal expansion substantially different from that of glass, a relatively thick layer comprising resilient adhesive material bonding said crystalline element to each of said quarter-wave elements, means bonding each of said quarter-wave elements to one of said glass layers, a layer of light-polarizing material bonded to the outer surface of each of said glass layers with its axis at an angle of substantially 45° to a vibration direction of the quarter-wave element adjacent thereto, and a further layer of glass bonded to each of said light-polarizing layers.

4. As a new article of manufacture, a lamination comprising, in combination, two layers of glass, two elements comprising quarter-wave retardation material positioned between said glass layers, a birefringent crystalline element positioned between said quarter-wave elements and comprising material having a coefficient of thermal expansion substantially different from that of glass, a relatively thick layer comprising resilient adhesive material bonding said crystalline element to each of said quarter-wave elements, means bonding each of said quarter-wave elements to one of said glass layers, a layer of light-polarizing material bonded to the outer surface of each of said glass layers with its axis at an angle of substantially 45° to a vibration direction of the quarter-wave element adjacent thereto, and a further layer of glass bonded to each of said light-polarizing layers, the bonding means between said light-polarizing layers and said glass layers comprising substantially polymerized butyl methacrylate.

5. As a new article of manufacture, a lamination comprising, in combination, two layers of glass, two elements comprising quarter-wave retardation material positioned between said glass layers, a birefringent crystalline element positioned between said quarter-wave elements and comprising material having a coefficient of thermal expansion substantially different from that of glass, a relatively thick layer comprising resilient adhesive material bonding said crystalline element to each of said quarter-wave elements, the bonding material between said crystalline element and said quarter-wave elements and between said quarter-wave elements and said first-named glass layers comprising a polymerized, incomplete polyvinyl acetal resin plasticized with glycerol triricinoleate, a layer of light-polarizing material bonded to the outer surface of each of said glass layers with its axis at an angle of substantially 45° to a vibration direction of the quarter-wave element adjacent thereto, and a further layer of glass bonded to each of said light-polarizing layers.

6. As a new article of manufacture, a lamination comprising, in combination, two layers of glass, two elements comprising quarter-wave retardation material positioned between said glass layers, a birefringent crystalline element positioned between said quarter-wave elements and comprising material having a coefficient of thermal expansion substantially different from that of glass, a relatively thick layer comprising resilient adhesive material bonding said crystalline element to each of said quarter-wave elements, means bonding each of said quarter-wave elements to one of said glass layers, a layer of light-polarizing material bonded to the outer surface of each of said glass layers with its axis at an angle of substantially 45° to a vibration direction of the quarter-wave element adjacent thereto, and a further layer of glass bonded to each of said light-polarizing layers, the bonding means between said light-polarizing layers and said glass layers comprising a substantially polymerized ester of acrylic acid.

7. As a new article of manufacture, a lamination comprising, in combination, two layers of glass, two elements comprising quarter-wave retardation material positioned between said glass layers, a birefringent crystilline element positioned between said quarter-wave elements and comprising material having a coefficient of thermal expansion substantially different from that of glass, a relatively thick layer comprising resilient adhesive material bonding said crystalline element to each of said quarter-wave elements, means bonding each of said quarter-wave elements to one of said glass layers, a layer of light-polarizing material bonded to the outer surface of each of said glass layers with its axis at an angle of substantially 45° to a vibration direction of the quarter-wave element adjacent thereto, and a further layer of glass bonded to each of said light-polarizing layers, the bonding means between said light-polarizing layers and said glass layers comprising a substantially polymerized ester of methacrylic acid.

CLINTON J. T. YOUNG.

REFERENCES CITED

The following references are of record in the file of this patent:

UNITED STATES PATENTS

| Number | Name | Date |
| --- | --- | --- |
| 2,255,933 | Land | Sept. 16, 1941 |
| 2,184,999 | Land et al. | Dec. 26, 1939 |
| 2,323,059 | Land | June 29, 1943 |

(Other references on following page)

| Number | Name | Date |
|---|---|---|
| 1,734,022 | Short | Oct. 29, 1929 |
| 2,320,375 | Moulton | June 1, 1943 |
| 1,924,580 | Walkins | Aug. 29, 1933 |
| 2,137,165 | Knight | Nov. 15, 1938 |
| 2,071,411 | Lamesch | Feb. 23, 1937 |
| 2,245,257 | Crumrine | June 10, 1941 |
| 2,018,214 | Land | Oct. 22, 1935 |
| 1,936,953 | Richter | Nov. 28, 1933 |
| 2,058,703 | Malivert | Oct. 27, 1936 |
| 2,168,221 | Land | Aug. 1, 1939 |
| 2,320,275 | Moulton | June 1, 1943 |
| 2,340,476 | Keim | Feb. 1, 1944 |
| 2,060,104 | Moulton | Nov. 10, 1936 |
| 2,239,527 | Kamerer | Apr. 22, 1941 |
| 2,388,051 | Guellich | Oct. 30, 1945 |

OTHER REFERENCES

Wright, Text on Light, publ. 1892, Macmillan & Co., N. Y., p. 364, 365, and plate 8, opposite page 360. (Copy in Div. 7.)